(12) United States Patent
Goud et al.

(10) Patent No.: US 7,275,152 B2
(45) Date of Patent: Sep. 25, 2007

(54) FIRMWARE INTERFACING WITH NETWORK PROTOCOL OFFLOAD ENGINES TO PROVIDE FAST NETWORK BOOTING, SYSTEM REPURPOSING, SYSTEM PROVISIONING, SYSTEM MANAGEABILITY, AND DISASTER RECOVERY

(75) Inventors: Gundrala D. Goud, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 10/672,012

(22) Filed: Sep. 26, 2003

(65) Prior Publication Data

US 2005/0071623 A1 Mar. 31, 2005

(51) Int. Cl.
G06F 1/24 (2006.01)
(52) U.S. Cl. ............................ 713/2; 709/215; 709/250
(58) Field of Classification Search ................ 709/212, 709/250; 713/2
See application file for complete search history.

(56) References Cited

U.S. PATENT DOCUMENTS 6,988,193 B2 * 1/2006 French et al. .................. 713/2
7,058,797 B2 * 6/2006 Miyamoto et al. ............. 713/1
2004/0049600 A1 * 3/2004 Boyd et al. .................. 709/250
2006/0031668 A1 * 2/2006 Miyamoto et al. ............. 713/2

OTHER PUBLICATIONS

Pinkerton, J., "The Case for RDMA," RDMA Consortium, May 29, 2002, (27 pages).
Recio, R., "RDMA enabled NIC (RNIC) Verbs Overview," Apr. 29, 200?, (pp. 1-28).
"TOE (TCP offload engine)," NetworkWorldFusion, http://www.nwfusion.com/links/Encyclopedia/T/653.html, (Jul. 30, 2003).

* cited by examiner

Primary Examiner—Chun Cao
Assistant Examiner—Albert Wang
(74) Attorney, Agent, or Firm—Blakely, Sokoloff, Taylor & Zafman LLP

(57) ABSTRACT

A system and method to quickly and efficiently transfer data over a network to a processing system during a pre-boot runtime of the processing system. During a pre-boot runtime of the processing system, a plurality of data packets is received via a network. Each of the plurality of data packets contains one of a corresponding plurality of data segments. The plurality of data packets are parsed using a network protocol stack to extract the plurality of data segments during the pre-boot runtime. A portion of the network protocol stack is executed in a hardware entity of the processing system. The plurality of data segments is transferred into system memory of the processing system during the pre-boot runtime.

22 Claims, 7 Drawing Sheets

FIRMWARE INTERFACING WITH NETWORK PROTOCOL OFFLOAD ENGINES TO PROVIDE FAST NETWORK BOOTING, SYSTEM REPURPOSING, SYSTEM PROVISIONING, SYSTEM MANAGEABILITY, AND DISASTER RECOVERY

TECHNICAL FIELD

This disclosure relates generally to computer communications over a network, and in particular but not exclusively, relates to firmware interfacing with network protocol offload engines efficient networking functionality.

BACKGROUND INFORMATION

Network servers are often used to host data for distribution to large numbers of client computers. When transferring data to/from another computer on the network, the central processing unit ("CPU") of the network server acts as traffic cop for transfers of data across the network. The CPU must repeatedly interrupt application processing to execute its network protocol stack and thereby service the data transfer requests. Thus, each bit of input/output ("I/O") transferred by the CPU of the network server slows down application processing also executing on the CPU. As 1 Gbit and 10 Gbit Ethernet networks are deployed, even a CPU running at 1 GHz has little hope of keeping up with I/O demands.

Often, networks having large numbers of network servers are provisioned or repurposed over the network using a boot server. The boot server transfers provisioning and/or repurposing data to the network servers. This provisioning and/or repurposing data can be multi-Gbit files. Thus, 1 Gbit or 10 Gbit networks can easily swamp a CPU executing a network protocol stack in software, thereby prolonging a network server's provisioning and/or repurposing time.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for firmware to interface with one or more network protocol offload engines to free up central processing unit ("CPU") bandwidth during network transactions are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Pre-boot runtime" is defined herein as the execution runtime of a processor or CPU prior to loading and executing an operating system ("OS"). "Provisioning" is defined herein as the act of installing an OS, a firmware update, and other software application from a remote server to a processing (client) system. "Repurposing" is defined herein as the act of installing an alternate OS or alternate firmware/software application from a remote server to a processing (client) system. A "data segment" is defined herein as a portion of a data block, which has been divided into segments for transmission over a network.

In short, embodiments of the present invention modify a network protocol stack used in firmware to take advantage of network protocol offload engines provided in hardware. By transferring the burden of executing network protocols such, as user datagram protocol ("UDP"), from execution by a CPU/processor to other hardware, the burden placed on the CPU/processor to transfer data over a network is alleviated, freeing CPU/processor bandwidth for other tasks and accelerating data transfers over the network. Embodiments of the present invention further include firmware applications/drivers interfacing with a transmission control protocol/internet protocol ("TCP/IP") offload engine and a remote direct memory access ("RDMA") offload engine to increase network transmission speeds and free up CPU bandwidth. These and other embodiments are described in detail below.

Figure 1:
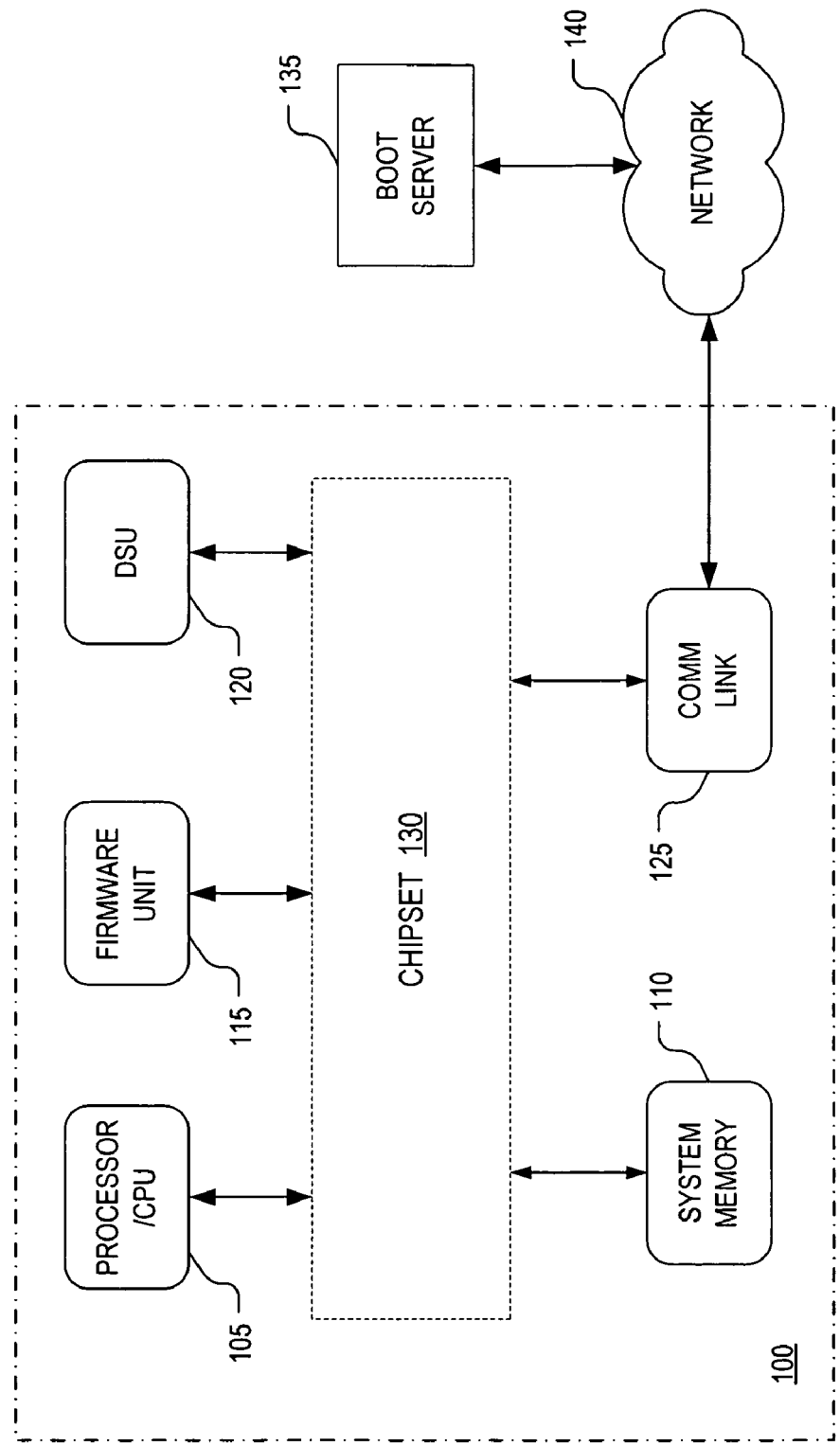
FIG. 1 is a block diagram illustrating a processing system to implement firmware interfacing with network protocol offload engines, in accordance with an embodiment of the present invention.

FIG. 1 is a block diagram illustrating a processing system 100 to implement firmware interfacing with network protocol offload engines, in accordance with an embodiment of the present invention. The illustrated embodiment of processing system 100 includes a processor (or CPU) 105, system memory 110, a firmware unit 115, a data storage unit ("DSU") 120, a communication link 125, and a chipset 130. In one embodiment, communication link 125 of processing system 100 is further communicatively coupled to boot server 135 via a network 140.

The elements of processing system 100 are interconnected as follows. Processor 105 is communicatively coupled to system memory 110, firmware unit 115, DSU 120, and communication link 125, via chipset 130 to send and to received instructions thereto/therefrom. In one embodiment, firmware unit 115 is a flash memory device. In other embodiments, firmware unit 115 includes any one of read only memory ("ROM"), programmable ROM, erasable programmable ROM, electrically erasable programmable ROM, or the like. In one embodiment, system memory 110 includes random access memory ("RAM"). In one embodiment, communication link 125 includes a network interface card ("NIC"). DSU 120 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 120 is illustrated as internal to processing system 100, DSU 120 may be external coupled to processing system 100.

Boot server 135 is coupled to communication link 125 to send data blocks to processing system 100 via network 140. Network 140 may include a wired and/or a wireless network, such as a local area network ("LAN"), a wide area network ("WAN"), or the Internet.

It should be appreciated that various other elements of processing system 100 have been excluded from FIG. 1 and this discussion for the purposes of clarity. For example, processing system 100 may further include a graphics card, additional processors, and additional DSUs. Chipset 130 may also include a system bus and various other data buses for interconnecting subcomponents, such as a memory controller hub and an I/O controller hub, as well as data buses for connecting peripheral devices to chipset 130.

Figure 2:
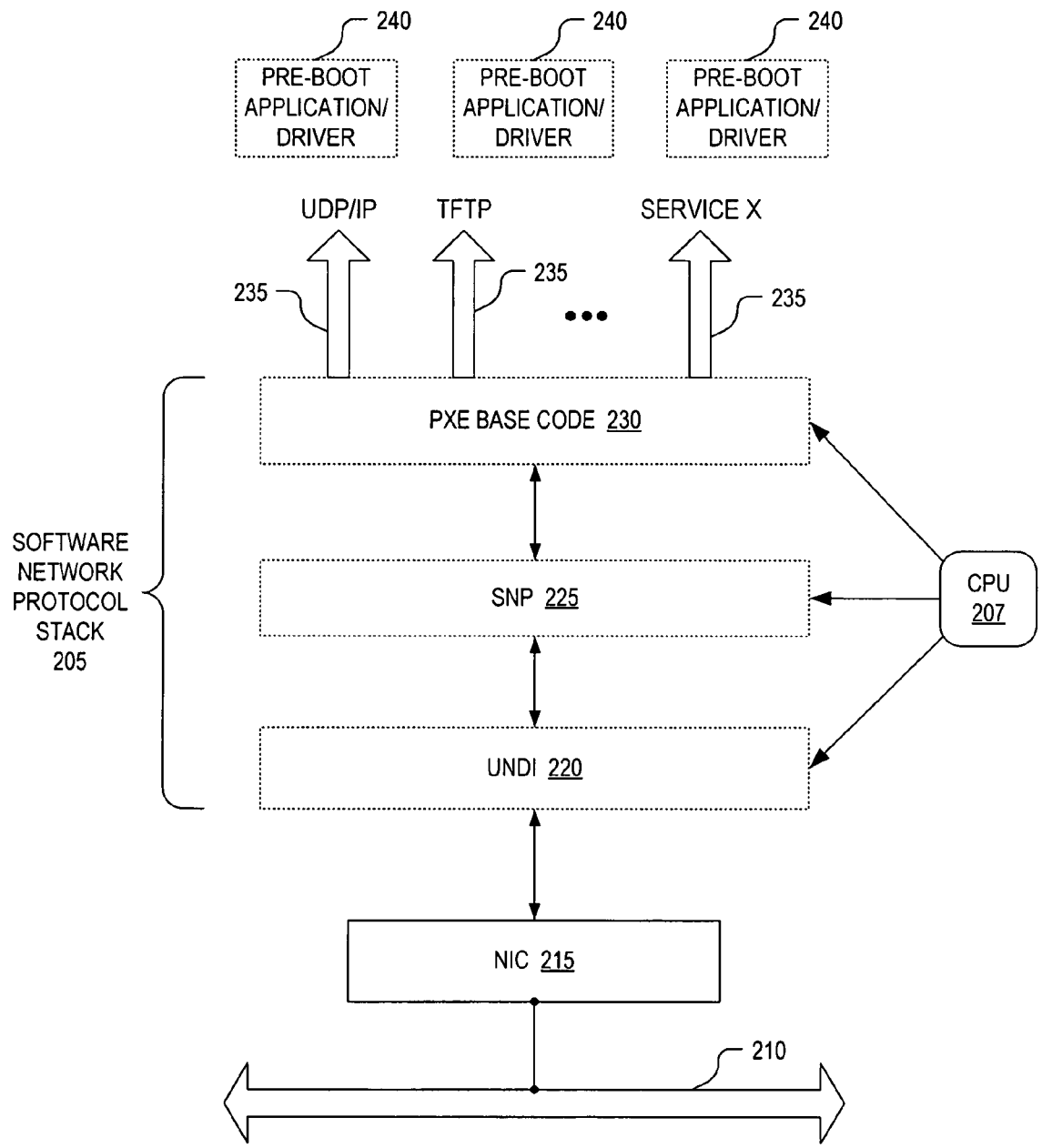
FIG. 2 is a block diagram illustrating a known software network protocol stack executed by a central processing unit ("CPU") of a processing system.

FIG. 2 is a block diagram illustrating a known software network protocol stack 205 executed by a CPU 207 during a pre-boot runtime to communicate across a network 210 via a network interface card ("MC") 215. Software network protocol stack 205 includes a universal network driver interface ("UNDI") layer 220, a simple network protocol ("SNP") layer 225, and pre-boot execution environment base code ("PXE_BC") 230. Software network protocol stack 205 publishes interfaces 235 for network services to pre-boot applications (or drivers) 240 executing on CPU 207. The network services enable pre-boot applications 240 to communicate across network 210 during a pre-boot runtime.

Software network protocol stack 205 is implemented under an extensible firmware framework standard known as the Extensible Firmware Interface ("EFI") (specifications and examples of which may be found at http://developer.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., flash memory). More particularly, EFI enables firmware, in the form of firmware modules and drivers, to be loaded from a variety of different resources, including primary and secondary flash devices, ROMs, various persistent storage devices (e.g., hard disks, CD ROMs, etc.), and even over computer networks.

UNDI layer 220 is an architectural interface to NIC 215. UNDI layer 220 understands how to interact with NIC 215 to pull packets off and push packets on network 210. SNP layer 225 presents a packet level interface to upper level protocols for access to NIC 215 via UNDI 220. SNP layer 225 provides services to initialize NIC 215, transmit packs, receive packets, and close a network interface. PXE_BC 230 is a protocol used to control PXE-compatible devices. The features of these devices are defined in the PXE Specification, Version 2.1, Sep. 20, 1999, available from Intel Corporation of Santa Clara, Calif. PXE_BC 230 is layered on top of SNP 225 enabling remote booting over a network of an operating system ("OS").

Software network protocol stack 205 publishes interfaces 235 for network services including a user datagram protocol ("UDP"). UDP is a unreliable delivery protocol widely used for real-time audio and video traffic where lost packets are simply ignored due to the lack of time to retransmit. UDP simply sends out data packets in a one-way transmission without return acknowledgements (i.e., handshaking). Software network protocol stack 205 may also provide UDP packets over internet protocol, referred to as UDP/IP. Software network protocol stack 205 may also publish an interface 235 for a trivial file transfer protocol ("TFTP") service. TFTP enables file transfers over a network. Various other interfaces 235 may be published by software network protocol stack 205.

Providing the above demonstrative network services via software network protocol stack 205 requires consumption of CPU 207's processing bandwidth. Each time one of pre-boot applications 240 request transfer of a data packet across network 210, CPU 207 must execute each layer of software network protocol stack 205. If network 210 is a high bandwidth network (e.g., 1 Gbit Ethernet), a substantial amount or even all of the processing bandwidth may be consumed, leaving little or no bandwidth for other applications/drivers executing on CPU 207.

Figure 3:
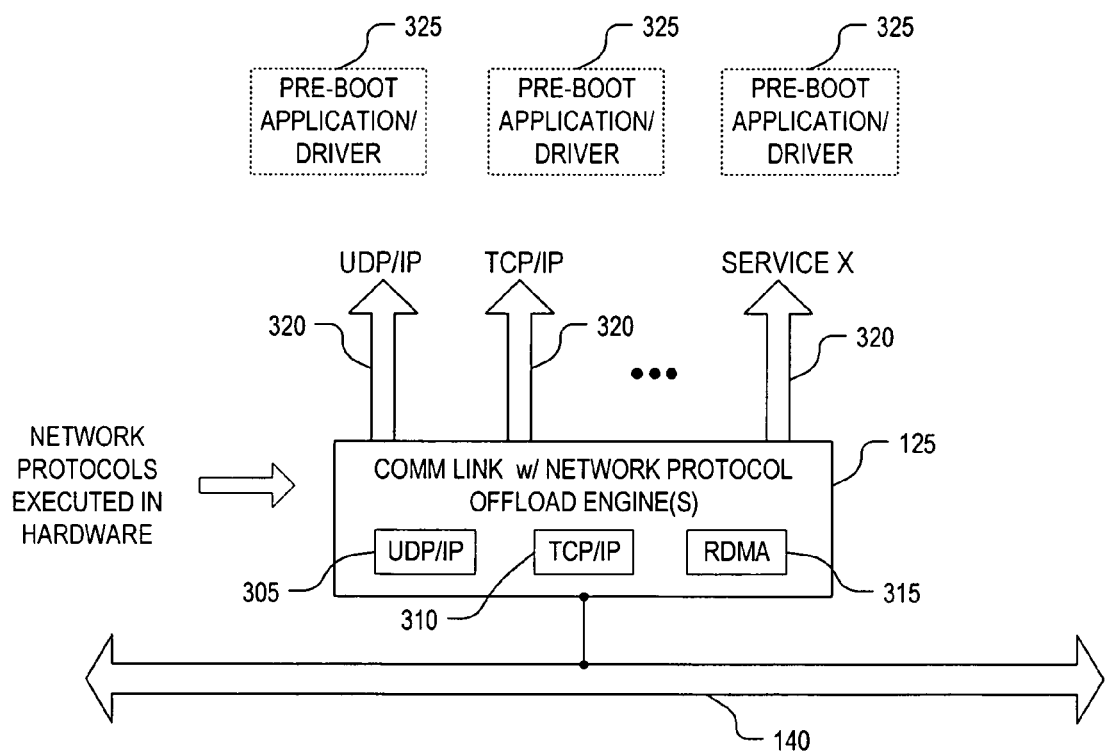
FIG. 3 is a block diagram illustrating a communication link having network protocol offload engines to free up processor bandwidth, in accordance with an embodiment of the present invention.

FIG. 3 is a block diagram illustrating an embodiment of communication link 125 having network protocol offload engines to free up processing bandwidth of processor 105, in accordance with an embodiment of the present invention. The illustrated embodiment of communication link 125 includes a UDP/IP offload engine ("UOE") 305, TCP/IP offload engine ("TOE") 310, and a remote direct memory access ("RDMA") offload engine ("ROE") 315.

Communication link 125 directly publishes interfaces 320 to pre-boot applications (or drivers) 325, enabling pre-boot applications 325 to execute tasks across network 140 without requiring processor 105 executing a software network protocol stack. Rather, UOE 305, TOE 310, and ROE 315 provide the networking services provided by software network protocol stack 205 (FIG. 2) in hardware. An example of communication link 125 is the Alacritech 1000×1 Single-Port Server and Storage Accelerator available by Alacritech, Inc. of San Jose, Calif. Thus, pre-boot applications 325 look to communication link 125 for a network service (e.g., UDP/IP, TCP/IP, etc.), as opposed to a software network protocol stack (e.g., software network protocol stack 205), thereby bypassing processor 105 and freeing up processor 105 to execute other tasks.

Figure 4:
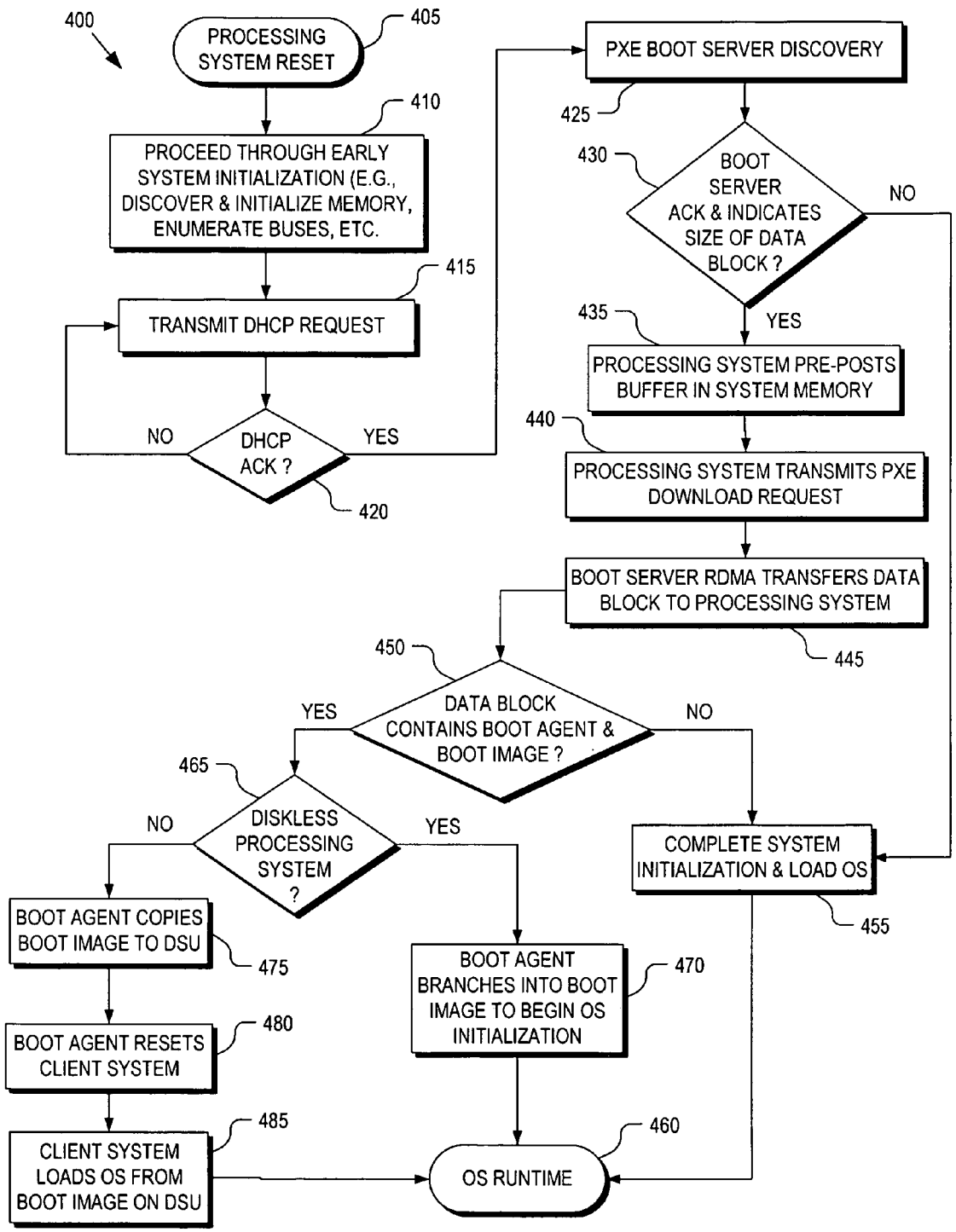
FIG. 4 is a flow chart illustrating a process to remote direct memory access transfer a data block into system memory of a processing system during a pre-boot runtime of the processing system, in accordance with an embodiment of the present invention.
Figure 5:
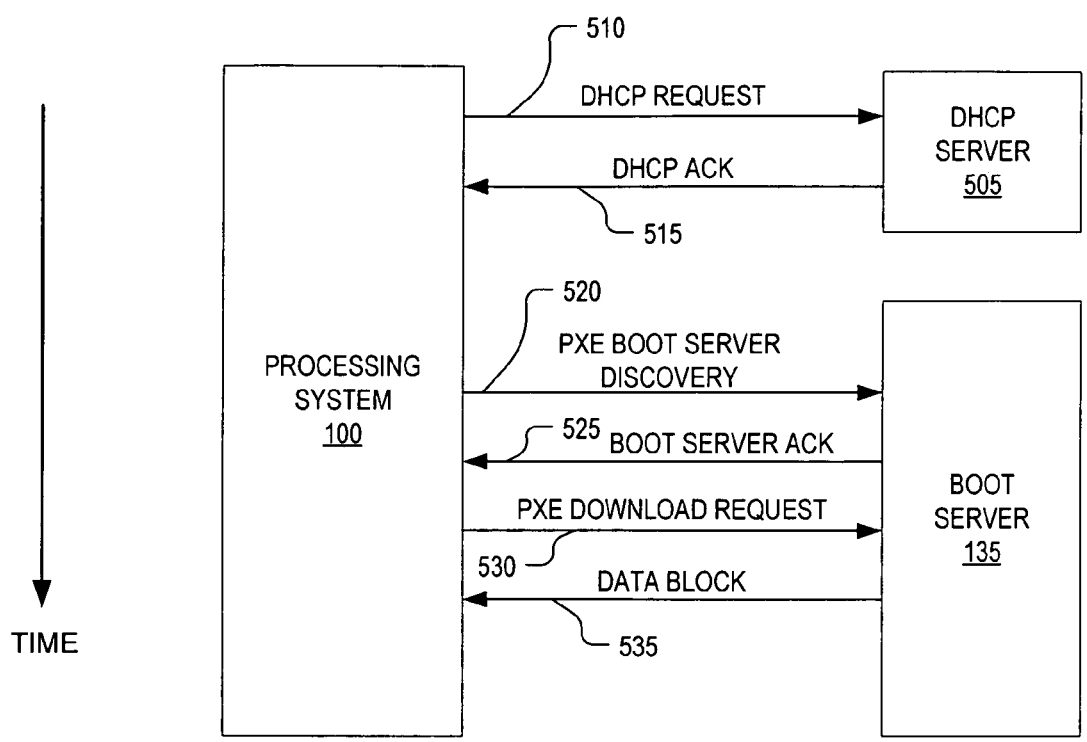
FIG. 5 is a timing diagram illustrating chronological signals communicated between a processing system and a boot server to transfer a data block to the processing system during a pre-boot runtime of the processing system, in accordance with an embodiment of the present invention.

Techniques to transfer a data block from boot server 135 to processing system 100 using offload engines during a pre-boot runtime are described in connection with FIGS. 4 through 6. FIG. 4 is a flow chart illustrating a process 400 to RDMA transfer a data block into system memory 110 of processing system 100 during a pre-boot runtime, in accordance with an embodiment of the present invention.

In a process block 405, processing system 100 is power cycled. Power cycling processing system 100 includes a reset event or a power on event. In a processing block 410, processing system 100 executes early system initialization tasks. Typically, early system initialization includes tasks such as a power on self test ("POST"), discovering memory resources (e.g., system memory 100, firmware unit 115), initializing the memory resources, discovering platform hardware, initializing the platform hardware, and the like.

In a process block 415, processing system 100 broadcasts a PXE dynamic host configuration protocol ("DHCP") request over network 140. FIG. 5 is a timing diagram illustrating chronological signaling between processing system 100, boot server 135, and a DHCP server 505 during a pre-boot runtime of processing system 100, in accordance with an embodiment of the present invention. Signal 510 contains the DHCP request. The DHCP request is a request by processing system 100 to be assigned an IP address by DHCP server 505. Although DHCP server 505 and boot server 135 are illustrated as separate entities in FIG. 5, the functionality of DHCP server 505 may be integrated into boot server 135. In a decision block 420, processing system 100 waits to receive a DHCP acknowledge ("ACK"), illustrated in FIG. 5 as signal 515. Typically, if processing system 100 fails to receive the DHCP ACK within a prescribed period of time, processing system 100 returns to processing block 415 and rebroadcasts the DHCP request. However, if processing system 100 does receive the DHCP ACK from boot server 505, process 400 continues to a process block 425.

Once processing system 100 has a valid IP address, processing system 100 can proceed to download a data block from boot server 135 over network 140. In process block 425, processing system 100 transmits a PXE boot server discovery request over network 140, illustrated in FIG. 5 as signal 520. The PXE boot server discovery request is an attempt by processing system 100 to determine whether a boot server is coupled to network 140, and further, if a boot server is coupled to network 140, does the boot server contain a data block for processing system 100 to download. In a decision block 430, if boot server 135 does have a data block to transfer to processing system 100, boot server 135 transmits a boot server ACK to processing system 100, illustrated in FIG. 5 as signal 525. The boot server ACK not only indicates to processing system 100 that boot server 135 has a data block to transfer, but also includes a size of the data block.

Once processing system 100 knows that boot server 135 has a data block to transfer and also knows the size of the data block to transfer, processing system 100 pre-posts a buffer in system memory 110 having a corresponding size (process block 435). To illustrate, FIG. 6 depicts processing system 100 including system memory 110 having pre-posted buffer 605, in accordance with an embodiment of the present invention. In a process block 440, processing system 100 transmits a PXE download request to boot server 440, illustrated as signal 530 in FIG. 5. The PXE download request indicates to boot server 135 to commence transfer of the data block.

In a process block 445, boot server 135 RDMA transfers a data block 610 into buffer 605. Data block 610 may contain an OS boot image, update files, data files, software applications, firmware, and the like. In fact, process 400 may be implemented to transfer any type of software/firmware from boot server 135 to processing system 100. In one embodiment, the RDMA transfer of data block 610 uses TOE 310 and ROE 315 to ensure a reliable data transfer without overburdening processor 105. Using TOE 310 and ROE 315, processing system 100 can RDMA transfer large gigabyte size data blocks 610 quickly and efficiently while freeing processor 105 to execute other tasks during the pre-boot runtime. In one embodiment, data block 610 is divided into a plurality of data segments, which are encapsulated in a corresponding plurality of data packets, for transfer to processing system 100 over network 140.

In a decision block 450, if data block 610 does not include a boot image, then the transfer is complete and process 400 continues to a process block 455. In this manner boot server 135 can quickly and efficiently transfer application software and/or data files to processing system 100 during a pre-boot runtime. In process block 455, processing system 100 completes its pre-boot system initialization, launches an OS loader, which in turn loads an OS kernel and device drivers. Once the OS takes control of processing system 100, pre-boot runtime is terminated and process 400 continues to a process block 460 and commences execution during an OS runtime. The application software and/or data files transferred may simply remain in system memory 110 for temporary use therein or subsequently be transferred to DSU 120.

Figure 6:
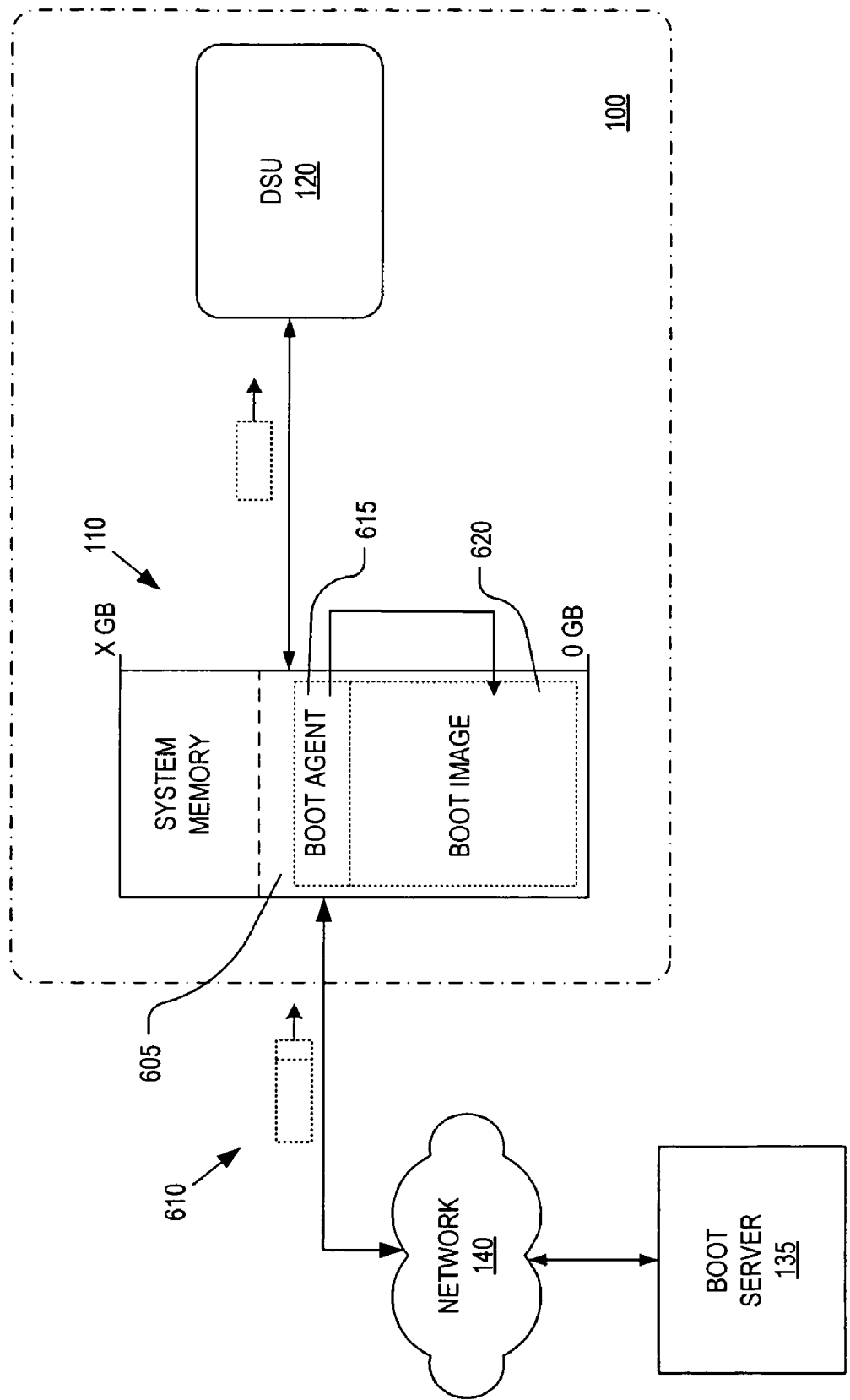
FIG. 6 is a block diagram illustrating transfer of a boot agent and a boot image into system memory of a processing system, in accordance with an embodiment of the present invention.

Returning to decision block 450, if data block 610 does contain a boot agent and a boot image, illustrated as boot agent 615 and boot image 620 in FIG. 6, then process 400 continues to a decision block 465. Boot server 135 may transfer data block 610 including boot agent 615 and boot image 620 to provision an otherwise "naked" processing system 100 with its first OS. Alternatively, boot server 135 may repurpose processing system 100 with a new OS to replace a current OS stored in system memory 110 and/or DSU 120.

In decision block 465, if processing system 100 is diskless (i.e., without DSU 120) process 400 continues to a process block 470. In process block 470, processor 105 begins executing boot agent 615. Boot agent 615 is knowledgeable about the particular OS contained within boot image 620. In one embodiment, upon executing boot agent 615, boot agent 615 executes and initializes various OS drivers contained within boot image 620 and then branches into OS to commence the OS runtime (process block 460).

Returning to decision block 465, if processing system 100 does include DSU 120 (as illustrated in FIGS. 1 and 6), process 400 continues to a process block 475. In a process block 475, processor 105 executes boot agent 615. In this case, boot agent 615 copies boot image 620 into DSU 120. Once boot image 620 is copied into DSU 120, boot agent 615 resets processing system 100, in a process block 480. After resetting, processing system 100 loads the OS (and optional application software) contained within boot image 620 stored on DSU 120 (process block 485). In this manner, boot server 135 is capable of provisioning or repurposing processing system 100. By repeating process 400 for a plurality of processing system 100, boot server 135 can quickly and efficiently provision and/or repurpose an entire network of computers or even a rack of processing blades. Embodiments of the present invention enable a system administrator to manage (e.g., provision, repurpose, etc.) a network of computers remotely from boot server 135. Furthermore, embodiments of the present invention may be used to quickly transfer a new OS to a processing system that has "crashed" due to a corrupted OS. Thus, the techniques described herein may be used to accelerate a disaster recovery process.

Returning to decision block 430, if processing system 100 does not receive a reply from boot server 135, then processing system 100 will determine that either no boot server is coupled to network 140 or boot server 135 does not have a data block to transfer to processing system 100. In this scenario, process 400 proceeds to process block 455, where the pre-boot initialization is completed and the OS loaded to commence execution in the OS runtime (process block 460).

Figure 7:
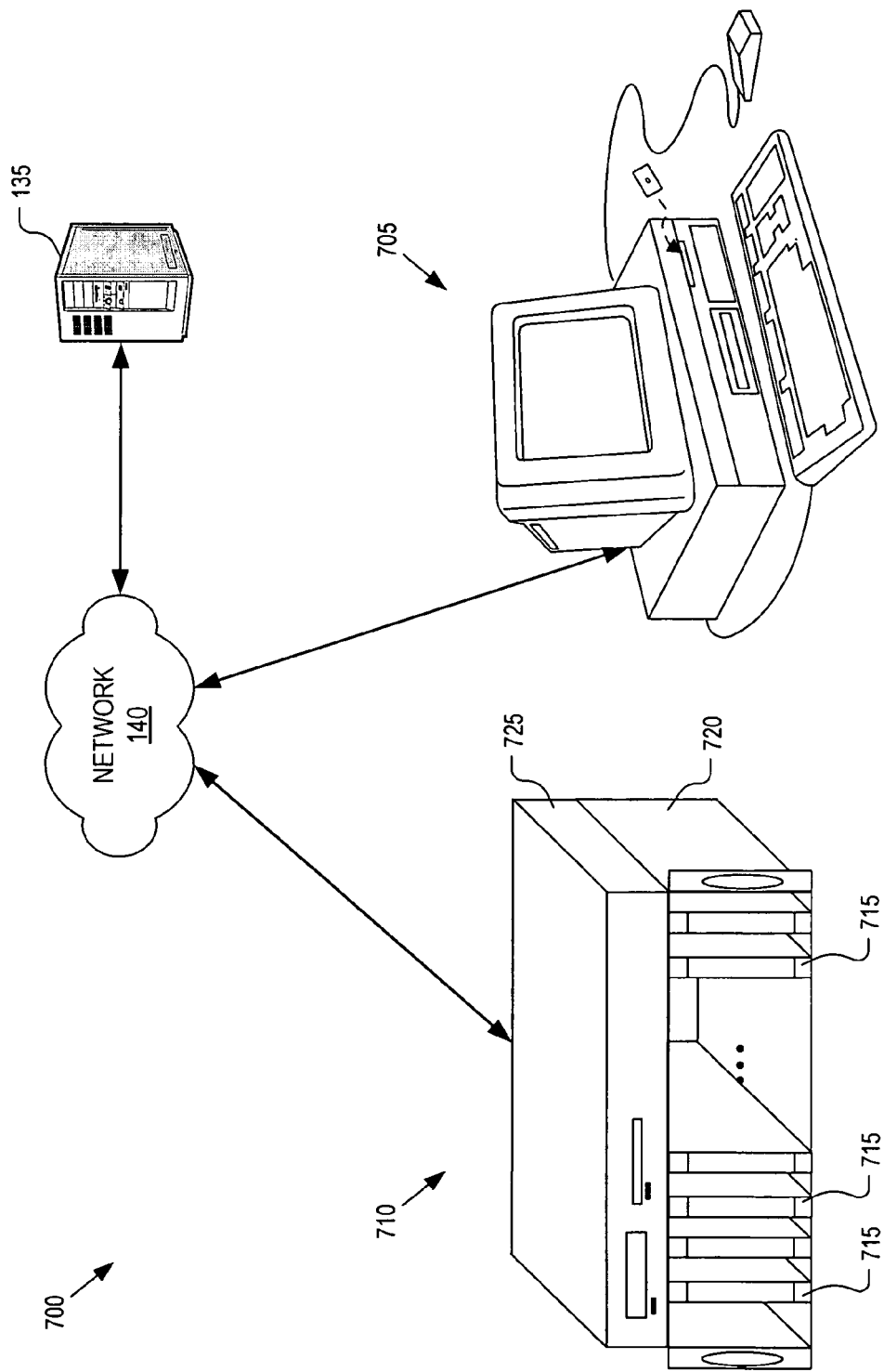
FIG. 7 is a diagram illustrating different types of processing systems having firmware to interface with network protocol offload engines, in accordance with an embodiment of the present invention.

FIG. 7 is a diagram illustrating a system 700 including different types of processing systems having firmware to interface with network protocol offload engines (e.g., UOE 305, TOE 310, and ROE 315), in accordance with embodiments of the present invention. The illustrated embodiment of system 700 includes boot server 135, network 140, a computer 705, and a blade server 710. The illustrated embodiment of blade server 710 includes multiple processing blades 715 housed within a chassis 720, and a media tray 725. Each of processing blades 715 and computer 705 are possible embodiments of processing system 100.

Each of processing blades 715 and computer 705 may include one or more communication links 125 coupled to network 140 to enable communication there over. As discussed above, communication links 125, in each of processing blades 715 and computer 705, includes one or more of UOE 305, TOE 310, and ROE 315. UOE 305, TOE 310, and ROE 315 enable processing blades 715 and computer 705 to send and receive data blocks over network 140 at high bit-rates without overburdening their respective processors. Using the techniques disclosed herein, UOE 305, TOE 310, and ROE 315 may be capitalized on during the pre-boot runtime of processing blades 715 and computer 705 to enable rapid and efficient provisioning and/or repurposing of processing blades 715 and computer 705.

It should further be appreciated that embodiments of the present invention may include boot server 135 having one or more of UOE 305, TOE 310, and UOE 305 for receiving data blocks over network 140 during a pre-boot runtime of boot server 135. Furthermore, once processing blades 715 and/or computer 705 have been provisioned/repurposed using the techniques described herein, processing blades 715 and computer 705 may act as servers themselves providing data blocks to other processing system communicatively coupled to network 140 (not shown).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    transmitting a boot server discovery request onto a network;
    receiving an acknowledgement in response to the boot server discovery request, the acknowledgement indicating a size of a block of data having a boot agent and a boot image to be transmitted to a processing system;
    pre-posting a buffer in system memory having a size based on the size of the block of data indicated in the acknowledgement, wherein the boot agent and the boot image are buffered in the buffer upon receipt at the processing system;
    receiving a plurality of data packets by a processing system via a network during a pre-boot runtime of the processing system, each of the plurality of data packets containing one of a corresponding plurality of data segments of a boot agent and a boot image, wherein the boot agent and the boot image are received at the processing system together as the block of data;
    parsing the plurality of data packets using a network protocol stack to receive the boot agent and the boot image during the pre-boot runtime, a portion of the network protocol stack executed in a hardware entity of the processing system using one or more network protocol offload engines during the pre-boot runtime;
    transferring the boot agent and the boot image into system memory of the processing system during the pre-boot runtime;
    executing the boot agent;
    branching into the boot image from the boot agent to initialize an operating system embedded within the boot image; and
    executing the operating system.

2. The method of claim 1 wherein transferring the boot agent and the boot image into the system memory further comprises transferring the boot agent and the boot image directly into the system memory via a remote direct memory access protocol ("RDMA").

3. The method of claim 1 wherein the portion of the network protocol stack executed in the hardware entity includes a transmission control protocol over Internet protocol ("TCP/IP").

4. The method of claim 3 wherein the TCP/IP is implemented in the hardware entity using a TCP/IP Offload Engine ("TOE").

5. The method of claim 3 wherein the portion of the network protocol stack executed in the hardware entity further includes a user datagram protocol over Internet protocol ("UDP/IP").

6. The method of claim 1, further comprising:
    pre-posting a buffer in the system memory of the processing system prior to receiving a first one of the plurality of data segments, the buffer having a size corresponding to a data block, the plurality of data segments comprising segments of the data block, and wherein transferring the plurality of data segments into the system memory includes transferring the plurality of data segments into the buffer in the system memory.

7. The method of claim 6 wherein the boot agent contains instructions for the processing system to execute to determine what to do with the boot image.

8. The method of claim 1 wherein the hardware entity comprises a network interface card.

9. A machine-accessible medium that provides instructions that, if executed by a machine, will cause the machine to perform operations comprising:
    transmitting a boot server discovery request onto a network;
    receiving an acknowledgement in response to the boot server discovery request, the acknowledgement indicating a size of a block of data having a boot anent and a boot image to be transmitted to a processing system;
    pre-posting a buffer in system memory having a size based on the size of the block of data indicated in the acknowledgement, wherein the boot agent and the boot image are buffered in the buffer upon receipt at the processing system;

receiving a plurality of data packets by a processing system via a network, each of the plurality of data packets containing one of a corresponding plurality of data segments of a boot agent and a boot image, wherein the boot agent and the boot image are received at the processing system together as the block of data;

parsing the plurality of data packets using a network protocol stack to receive the boot agent and the boot image during a pre-boot runtime of the processing system, wherein a portion of the network protocol stack is executed in a hardware entity of the processing system using one or more network protocol offload engines during the pre-boot runtime;

transferring the plurality of data segments into system memory of the processing system during the pre-boot runtime;

executing the boot agent;

copying the boot image onto a data storage unit ("DSU") of the processing system;

resetting the processing system; and booting the processing system from the boot image copied to the DSU.

10. The machine-accessible medium of claim 9, further providing instructions that, if executed by the machine, will cause the machine to perform the operations wherein transferring the plurality of data segments into the system memory further comprises transferring the plurality of data segments directly into the system memory via a remote direct memory access protocol ("RDMA").

11. The machine-accessible medium of claim 9, further providing instructions that, if executed by the machine, will cause the machine to perform the operations wherein the portion of the network protocol stack executed in the hardware entity includes a transmission control protocol over Internet protocol ("TCP/IP").

12. The machine-accessible medium of claim 11, further providing instructions that, if executed by the machine, will cause the machine to perform the operations wherein the TCP/IP is implemented in the hardware entity using a TCP/IP Offload Engine ("TOE").

13. The machine-accessible medium of claim 11, further providing instructions that, if executed by the machine, will cause the machine to perform the operations wherein the portion of the network protocol stack executed in the hardware entity further includes a user datagram protocol over Internet protocol ("UDP/IP").

14. The machine-accessible medium of claim 9, further providing instructions that, if executed by the machine, will cause the machine to perform further operations, comprising:

pre-posting a buffer in the system memory of the processing system prior to receiving a first one of the plurality of data segments, the buffer having a size corresponding to a data block, the plurality of data segments comprising segments of the data block, and wherein transferring the plurality of data segments into the system memory includes transferring the plurality of data segments into the buffer in the system memory.

15. The machine-accessible medium of claim 14, wherein the boot agent contains instructions for the processing system to execute to determine what to do with the boot image.

16. The machine-accessible medium of claim 9, wherein copying the boot image onto the DSU of the processing system includes copying over a previous boot image currently stored on the DSU with the boot image to repurpose the processing system.

17. The machine-accessible medium of claim 9, wherein copying the boot image onto DSU of the processing system includes copying the boot image onto the DSU having no previous boot image to provision the processing system with the boot image.

18. A method, comprising:

transmitting a boot server discovery request onto a network;

receiving an acknowledgement in response to the boot server discovery request, the acknowledgement indicating a size of a block of data having a boot agent and a boot image to be transmitted to a processing system;

pre-posting a buffer in system memory having a size based on the size of the block of data indicated in the acknowledgement, wherein the boot agent and the boot image are buffered in the buffer upon receipt at the processing system;

receiving a boot agent and a boot image at a processing system via a network during a pre-boot runtime of the processing system within a plurality of data packets, wherein the boot agent and the boot image are received at the processing system together as the block of data;

parsing the plurality of data packets using a network protocol stack to receive the boot agent and the boot image during the pre-boot runtime, wherein a portion of the network protocol stack is executed in a hardware entity of the processing system during the pre-boot runtime using one or more network protocol offload engines;

executing the boot agent;

copying the boot image onto a data storage unit ("DSU") of the processing system; and booting the processing system from the boot image copied to the DSU.

19. The method of claim 18, further comprising transferring the plurality of data segments directly into the system memory via a remote direct memory access protocol ("RDMA") implemented with one of the network protocol offload engines.

20. The method of claim 18, wherein the portion of the network protocol stack executed in the hardware entity includes a transmission control protocol over Internet protocol ("TCP/IP").

21. The method of claim 20, wherein the TCP/IP is implemented in the hardware entity using a TCP/IP Offload Engine ("TOE").

22. The method of claim 18, wherein the portion of the network protocol stack executed in the hardware entity includes a user datagram protocol over Internet protocol ("UDP/IP").

* * * * *